(12) United States Patent
Andrews et al.

(10) Patent No.: US 10,289,587 B2
(45) Date of Patent: May 14, 2019

(54) SWITCHING DEVICE USING BUFFERING

(71) Applicant: ARM Limited, Cambridge (GB)

(72) Inventors: Ian David Andrews, Sheffield (GB);
Andrew David Tune, Dronfield (GB);
Daniel Adam Sara, Sheffield (GB);
George Robert Scott Lloyd, Sheffield (GB)

(73) Assignee: Arm Limited, Cambridge (GB)

( * ) Notice: Subject to any disclaimer, the term of this patent is extended or adjusted under 35 U.S.C. 154(b) by 432 days.

(21) Appl. No.: 15/139,559

(22) Filed: Apr. 27, 2016

(65) Prior Publication Data
US 2017/0315947 A1    Nov. 2, 2017

(51) Int. Cl.
| G06F 13/40 | (2006.01) |
| G06F 13/16 | (2006.01) |
| G06F 13/42 | (2006.01) |
| G06F 13/36 | (2006.01) |

(52) U.S. Cl.
CPC ...... *G06F 13/4022* (2013.01); *G06F 13/1642* (2013.01); *G06F 13/1673* (2013.01); *G06F 13/36* (2013.01); *G06F 13/4031* (2013.01); *G06F 13/4282* (2013.01); *G06F 2213/36* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 5,896,516 A * | 4/1999 | Powell, Jr. ......... G06F 13/4022 710/317 |
| 6,628,609 B2 * | 9/2003 | Chapman ............. H04L 41/0896 370/229 |
| 6,657,960 B1 * | 12/2003 | Jeffries ................... H04L 47/10 370/230.1 |
| 6,717,945 B1 * | 4/2004 | Jue ...................... H04L 12/5601 370/392 |
| 6,848,017 B2 * | 1/2005 | MacEachern ..... G06F 15/17375 370/360 |

(Continued)

OTHER PUBLICATIONS

'Performance Analysis of Nonblocking Packet Switch with Input and Output Buffers' by Yuji Oie et al., IEEE Tranactions on (Year: 1992).*

(Continued)

*Primary Examiner* — Steven G Snyder
(74) *Attorney, Agent, or Firm* — Leveque IP Law, P.C.

(57) ABSTRACT

A crossbar switch comprises two or more data inputs 10, two or more data outputs 100, a buffer 30 between the inputs and the outputs, an arbiter 52 associated with each output and configured to select data from one of the inputs when there is contention at the output, a bypass 32 associated with the buffer so that the buffer can be enabled or disabled, and a buffer controller 60 configured to enable or disable the buffer. The buffer controller further includes an accumulator 70 configured to assess whether a time-based average of the contention rate, or an average injection rate, at the output associated with the buffer, has reached a predetermined threshold. This prevents the buffer being enabled when the contention is only intermittent, which reduces power consumption without significant loss of performance.

20 Claims, 5 Drawing Sheets

(56) References Cited

U.S. PATENT DOCUMENTS

| | | | | |
|---|---|---|---|---|
| 6,980,516 B1* | 12/2005 | Wibowo | ............... | H04L 47/10 |
| | | | | 370/235 |
| 7,917,647 B2* | 3/2011 | Cooper | ............... | H04L 41/046 |
| | | | | 370/229 |
| 8,027,256 B1* | 9/2011 | Subramanian | ......... | H04L 47/20 |
| | | | | 370/231 |
| 9,059,915 B2* | 6/2015 | Morandin | ............. | H04L 47/12 |
| 9,251,108 B2* | 2/2016 | Bass | ................ | G06F 13/1663 |
| 9,921,989 B2* | 3/2018 | Ganapathy | ......... | G06F 13/4036 |
| 2002/0146022 A1* | 10/2002 | Van Doren | ......... | H04L 49/108 |
| | | | | 370/412 |
| 2003/0103450 A1* | 6/2003 | Chapman | ........... | H04L 41/0896 |
| | | | | 370/229 |
| 2004/0042470 A1* | 3/2004 | Cooper | ............... | H04L 41/046 |
| | | | | 370/401 |
| 2013/0215899 A1* | 8/2013 | Stark | ..................... | H04L 47/39 |
| | | | | 370/394 |
| 2014/0064081 A1* | 3/2014 | Morandin | ............. | H04L 47/12 |
| | | | | 370/235 |
| 2014/0281081 A1* | 9/2014 | Lunadier | ............. | G06F 13/368 |
| | | | | 710/110 |
| 2015/0278136 A1* | 10/2015 | Chrysos | .............. | G06F 13/362 |
| | | | | 710/124 |

OTHER PUBLICATIONS

'Adaptive Max-min Fair Scheduling in Buffered Crossbar Switches Without Speedup' by Xiao Zhang et al., copyright IEEE, 2007. (Year: 2007).*

* cited by examiner

SWITCHING DEVICE USING BUFFERING

BACKGROUND

The present disclosure relates to buffering ahead of a shared resource, such as a switch, in particular a crossbar switch.

When switching or moving digital data in a crossbar switch, blockages may occur between the input and output, or source and destination. For instance, if data at two inputs is to be routed to a shared output, one of the data has to wait until the other is processed at the output.

If, behind the data that is caused to wait, there is further data that is destined for another output that is free, the further data will be blocked for that clock cycle and the resources of the switch will be underused.

In order to avoid such blocking and to maximise use of the system's resources, the blocked data can be buffered, and a decision made in the next cycle as to whether it is then processed. However, buffers are expensive in terms of resource (e.g. chip area) and power consumption. Hence it is desirable to minimise their use without compromising system performance.

The present disclosure aims to improve the use of buffering.

SUMMARY OF THE DRAWINGS

Buffering systems will now be described with reference to the attached drawings, in which.

DETAILED DESCRIPTION

According to a first technique, there is provided a switching fabric such as a crossbar switch comprising two or more data inputs, two or more data outputs, a buffer between the inputs and the outputs, an arbiter associated with each output and configured to select data from one of the inputs when there is contention at the output, a bypass associated with the buffer so that the buffer can be enabled or disabled, and a buffer controller configured to enable or disable the buffer, the buffer controller further including an accumulator configured to assess whether a time-based average of the contention rate of the output associated with the buffer has reached a predetermined threshold.

According to a second technique, there is provided a switching fabric such as a crossbar switch comprising two or more data inputs, two or more data outputs, a buffer between the inputs and the outputs, an arbiter associated with each output and configured to select data from one of the inputs when there is contention at the output, a bypass associated with the buffer so that the buffer can be enabled or disabled, and a buffer controller configured to enable or disable the buffer, the buffer controller further including a counter configured to assess whether a time-based average injection rate of the output associated with the buffer has reached a predetermined threshold.

According to a third technique, there is provided a method of switching in which arbitration is carried out between two or more inputs supplying data to two or more outputs, there being at least one buffer between the inputs and the outputs, and a bypass rendering the buffer capable of being enabled or disabled, wherein bypassing is enabled when a time average of the contention rate at the output, or of the injection rate of the output, is above a predetermined threshold value.

Figure 1:
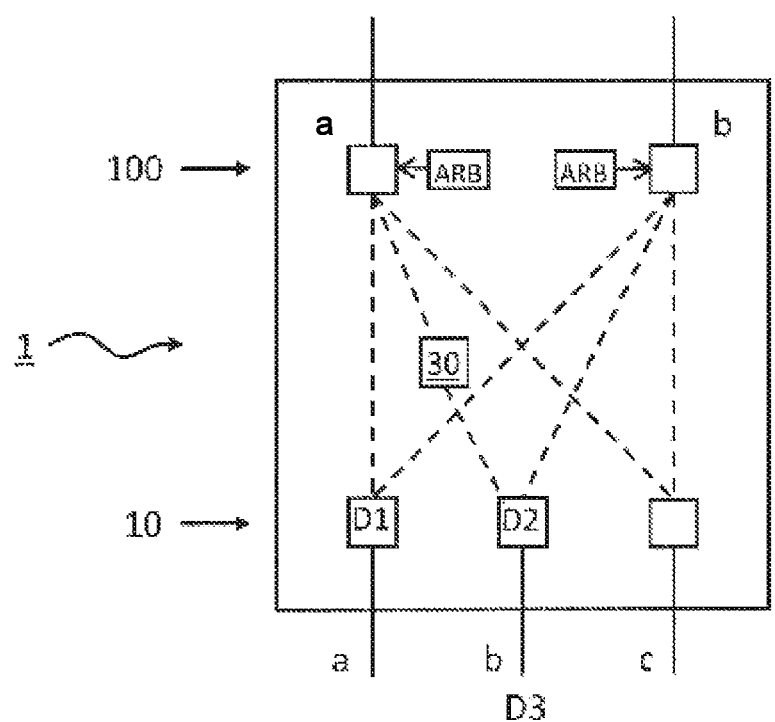
FIG. 1 is a schematic diagram of a switch with multiple inputs and outputs.

FIG. 1 is a schematic diagram of a switch 1, depicted as a crossbar switch 1, having inputs or "sources" 10 and outputs or "destinations" 100.

In the present illustrative example three inputs (10a-10c) and two outputs (100a & 100b) are shown; generally, there are at least two inputs and two outputs, but the exact number is not significant, nor need the number of inputs equal the number of outputs.

The crossbar switch 1 may be a component of a single IC (integrated circuit), or a free-standing component, for instance. Its purpose is to route data arriving at any of the inputs 10 to any of the outputs 100, as determined, for example, by the software being executed.

If data D1, D2 at two inputs 10a, 10b respectively is to be routed at the same time, e.g. in the same clock cycle, to the same output, say 100a, some form of arbitration has to be performed (e.g. by respective arbitrators (ARB)), so that the data, for example D1 at input 10a, is routed through the crossbar switch 1 and data D2 at the other input 10b is stalled due to contention at the output 100a.

Further data D3 arriving at the input 10b is then blocked until D2 is passed to the output 100a.

One way of assisting data flow is by providing a buffer 30 in the channel between the input 10b and output 100a in order to free the data (e.g. D2) at the input 10b for processing of further data arriving thereat (e.g. D3).

It will be appreciated that whilst only one buffer is depicted in FIG. 1, some or all channels between the inputs 10a-10c may comprise such buffers.

Figure 2:
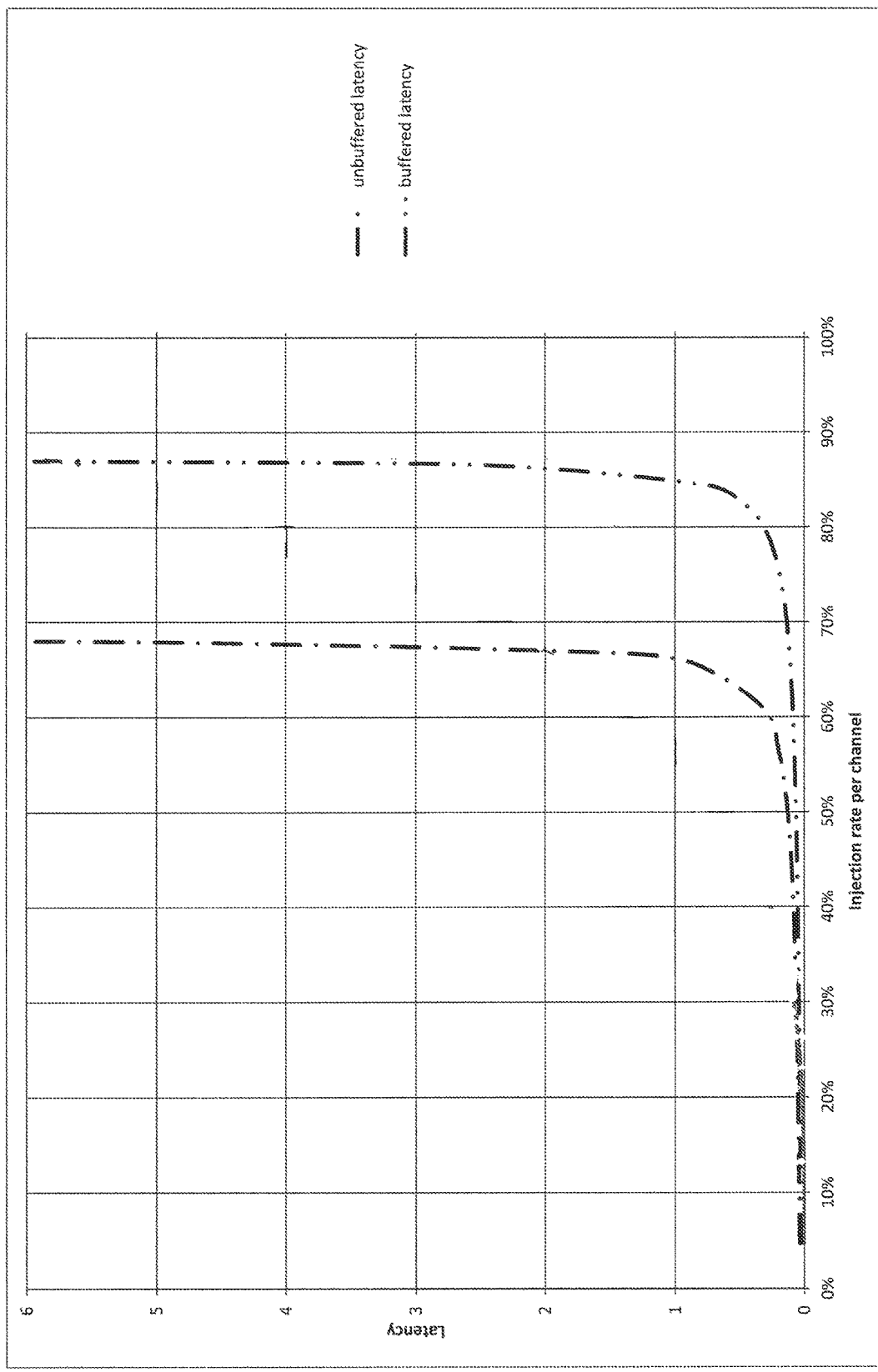
FIG. 2 is a graph of the effect of average injection rate on latency in the system, with and without buffering.

FIG. 2 is a graph showing a simulation of a crossbar switch, where latency, measured along the primary or left-hand Y-axis, is plotted against injection rate per channel or throughput, measured on the X-axis. Latency may be taken to be the time delay in passing data from an input to an output in the crossbar switch.

A channel would be represented in FIG. 1 by, say, the path from one input 10a to one output e.g. 100a (as shown by the dotted lines in FIG. 1). The single-dot chain line of FIG. 2 depicts latency with no buffering (i.e. when the buffers are disabled), whilst the double-dot chain line depicts the effect of buffering (i.e. when the buffers are enabled).

When the limit of throughput in a channel is reached (e.g. due to contention, when two or more inputs are destined for the same output at the same time), latency will be maximised and tends to infinity because the queue at the input of the channel will build.

It will be seen from FIG. 2 that enabling the buffers provides for a higher throughput in comparison to when buffers are not enabled.

In conventional systems, the buffers in a particular channel are enabled as soon as contention is detected at the output (i.e. instantaneous contention). Taking the example of FIG. 2, for conventional systems the buffers would be enabled for a particular channel as soon as contention is detected at the output of that channel, (latency >0), so that throughput is maximised.

However, such functionality may not provide a performance advantage because, for example, random contention may occur at low throughput or bandwidth, but the overall channel throughput will be the same over time whether or not the buffers are enabled. As the buffers may comprise a plurality of registers, merely enabling the buffers when contention is detected may result in considerable unnecessary power consumption within the system.

Figure 3:
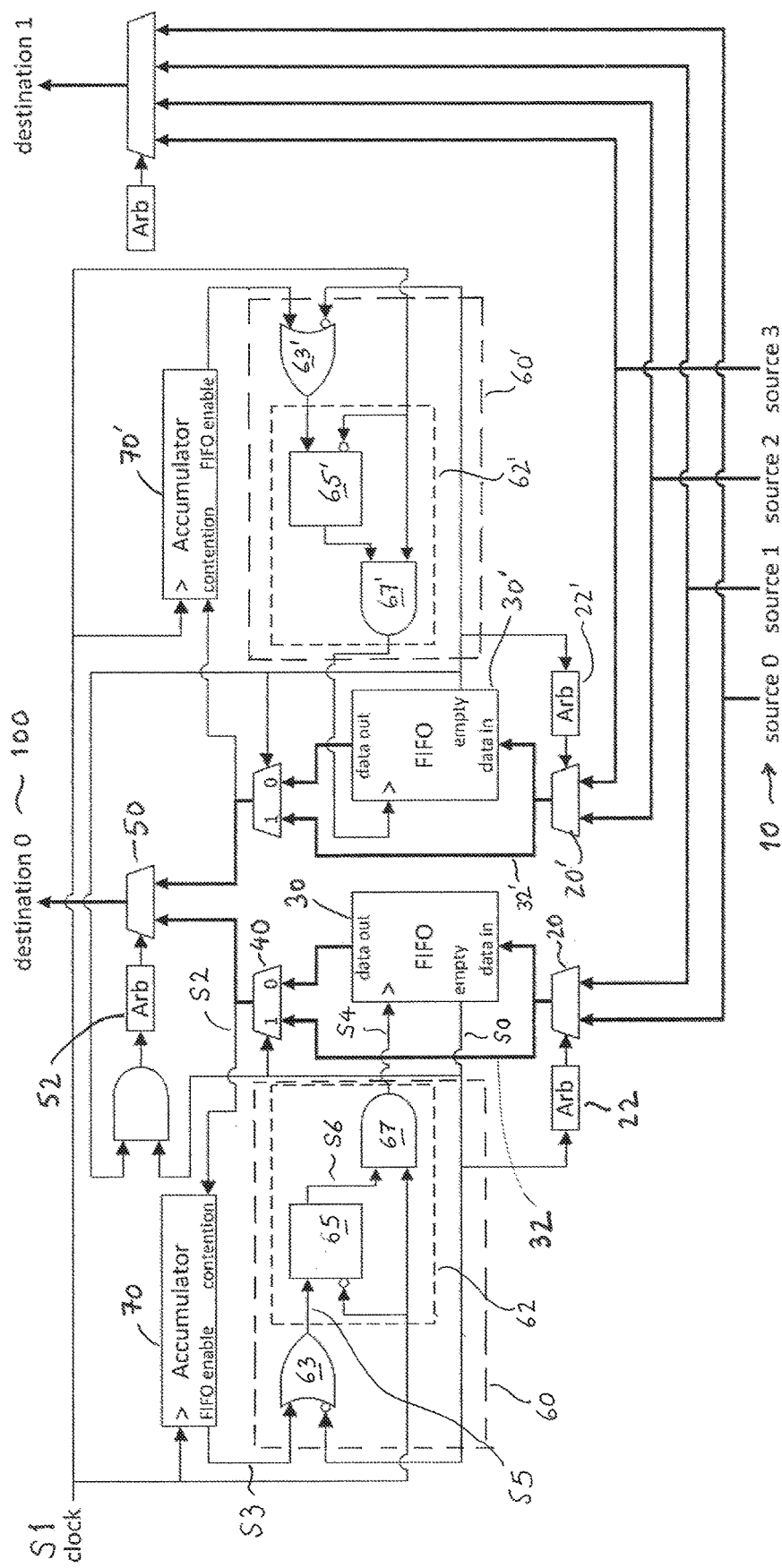
FIG. 3 is a schematic diagram showing the switch of FIG. 1 in greater detail.

FIG. 3 shows a detail of crossbar switch 1 according to the present techniques.

Four inputs 10 are shown in FIG. 3, labelled "Source 0" to "Source 3" respectively, whilst two outputs 100 are also shown, labelled "Destination 0" and "Destination 1" respectively.

In the present example, each input 10 has a path or channel to each of the outputs 100.

However, as data can only be sent from a particular input to a particular output at any one time, the inputs 10 are connected to the outputs 100 by circuitry, such as via a series of multiplexers and arbiters which control/select, according to suitable criteria, which data to route from an input to an output, through a particular channel in each cycle.

In the present example, the inputs 10 are connected in pairs to corresponding input multiplexers 20, 20' which are under the control of respective arbiters 22, 22'; each input multiplexer 20, 20' selects data from one of the respective inputs to be passed to a second or buffer multiplexer 40, 40' in the respective channel, as determined by the corresponding arbiter 22, 22'.

The output from the second multiplexer 40, 40' is passed to an output multiplexer 50, which is under the control of an output arbiter 52.

As above in FIG. 1, if there is contention at the output multiplexer 50—that is, if the data from both inputs (Source 0 and Source 1) are destined for the same output (destination 0)—then further data arriving at the inputs (Source 0 or Source 1) and destined for a different output (destination 1) must be held for at least one clock cycle until the respective input is clear. This may lead to head-of-line (HoL) blocking at the input at which the further data arrives.

In order to allow the further data to proceed to the different output (destination 1), the crossbar switch 1 incorporates at least one buffer 30, 30' in each channel between the input multiplexers 20, 20' and second multiplexers 40, 40'. A bypass 32, 32' is also provided in parallel with the respective buffers 30, 30'.

Looking at the channel having input multiplexer 20 and second multiplexer 40, the data is passed from the input multiplexer 20 to the second multiplexer 40 either via a buffer 30 or via a bypass 32.

In the present illustrative example, the buffer 30 is depicted as a first-in, first-out (FIFO) buffer, and the order of data from the input multiplexer 20 to the second multiplexer 40 is maintained, whereby the data selected by the second multiplexer 40 is dependent on inter alia a signal S0 from the buffer 30 indicative of whether or not the buffer 30 is empty.

In the present illustrative example, the second multiplexer 40 may select data from the bypass 32 when the buffer is empty. When there is data in the buffer, the second multiplexer will only select data from the buffer 30.

A controller 60 controls the buffer 30 to be enabled or disabled (on or off) (and the bypass to be disabled or enabled) according to the degree of contention, to be described.

The buffer-empty signal S0 may also be used to determine an arbitration scheme for the input multiplexer 20 and output multiplexer 50. For example, when the buffer 30, 30' for a particular channel is empty, the input multiplexers 20, 20' can in some embodiments be configured to select data in dependence on, for example, a first arbitration scheme (e.g. MRU or LRU), whilst the output multiplexer 50 may select data based on the same or a different arbitration scheme. Such functionality will be described with reference to FIG. 5 below.

In the present example, the circuitry is under the control of a common clock signal S1. In alternative examples, different components of the circuitry may be under the control of different clocks.

As per conventional systems, one way of controlling the buffers 30, 30' is to enable them whenever instantaneous contention is detected at the output. This may be achieved by transmitting a signal (not shown) from the output multiplexer 50 to the controller 60 so as to enable the buffer 30.

However, the present techniques recognise that this may not make the most efficient use of buffers, and in contrast to conventional systems, using the present techniques, in some embodiments, the buffers are enabled based on the activity of the output multiplexer 50, or on another measure of occupancy of the available resources.

In the present illustrative example, the buffer controller 60 receives a signal S3 from an accumulator 70, where S3 is generated based on, or in response to, a signal S2 from the buffer multiplexer 40 where it forms an input to the output multiplexer 50, where S2 corresponds to the rate of contention at the output multiplexer 50.

The controller 60 generates a signal S4 to clock or enable (or disable, as the case may be) the buffer 30 in response to signals S0, S1 and S3.

In the present illustrative example, the controller 60 includes an OR gate 63, producing an output S5 based on, or in response to, inputs S3 and S0, the latter being inverted so as to indicate that the buffer is not empty.

In the present example, the controller 60 also includes a clock gate circuit 62 having a latch 65 and an AND gate 67, where the output S6 from the latch 65, is used as one input to the AND gate 67 along with the clock S1 as a second input, whereby the AND gate 67 generates the signal S4 to enable or disable the buffer 30.

As above, for FIFO buffers, whenever the buffer 30 is enabled the respective bypass 32 is disabled, and when the buffer 30 is disabled, the respective bypass 32 may be enabled once the buffer 30 is empty (i.e. has no data therein). For non-FIFO buffers, there is no requirement to wait until the buffer is empty before enabling the bypass 32.

Using the present techniques, the buffer 30 is enabled by S4 only when a time average rate of contention exceeds a certain threshold value over two or more clock cycles. If the threshold is not reached, the buffer 30 will not be enabled.

Preferably the time average is a time-decaying average, such that, for example, only the most recent n clock cycles are counted ('n' being an integer >1, e.g. from 2 to 10). Thus, in the present example, the time-decaying average increases the accumulator 70 by a specified value, usually 1, whenever there is contention at the output and decreases it by a second value, which may also be 1, when there is no contention at the output.

Therefore, in contrast to conventional systems, using the present techniques the buffer or buffers 30 in a particular channel are only enabled when the time average of the contention rate exceeds a certain threshold value over two or more clock cycles. Such functionality reduces the amount of time of the buffers in a channel are enabled, and, therefore, may reduce the power consumption in the crossbar switch in comparison to conventional systems.

As depicted in FIG. 3, the channel having input multiplexer 20' and second multiplexer 40' also has associated accumulator 70' and control circuitry 60' for detecting when the time average of the contention rate exceeds a certain threshold value over two or more clock cycles.

Each of the four inputs 10 (Source 0 to Source 3) may also be connected to the second output (destination 1) by similar circuitry (e.g. multiplexers, buffers, bypass, control circuitry, accumulators, etc.), not shown in detail in FIG. 3.

Figure 4:
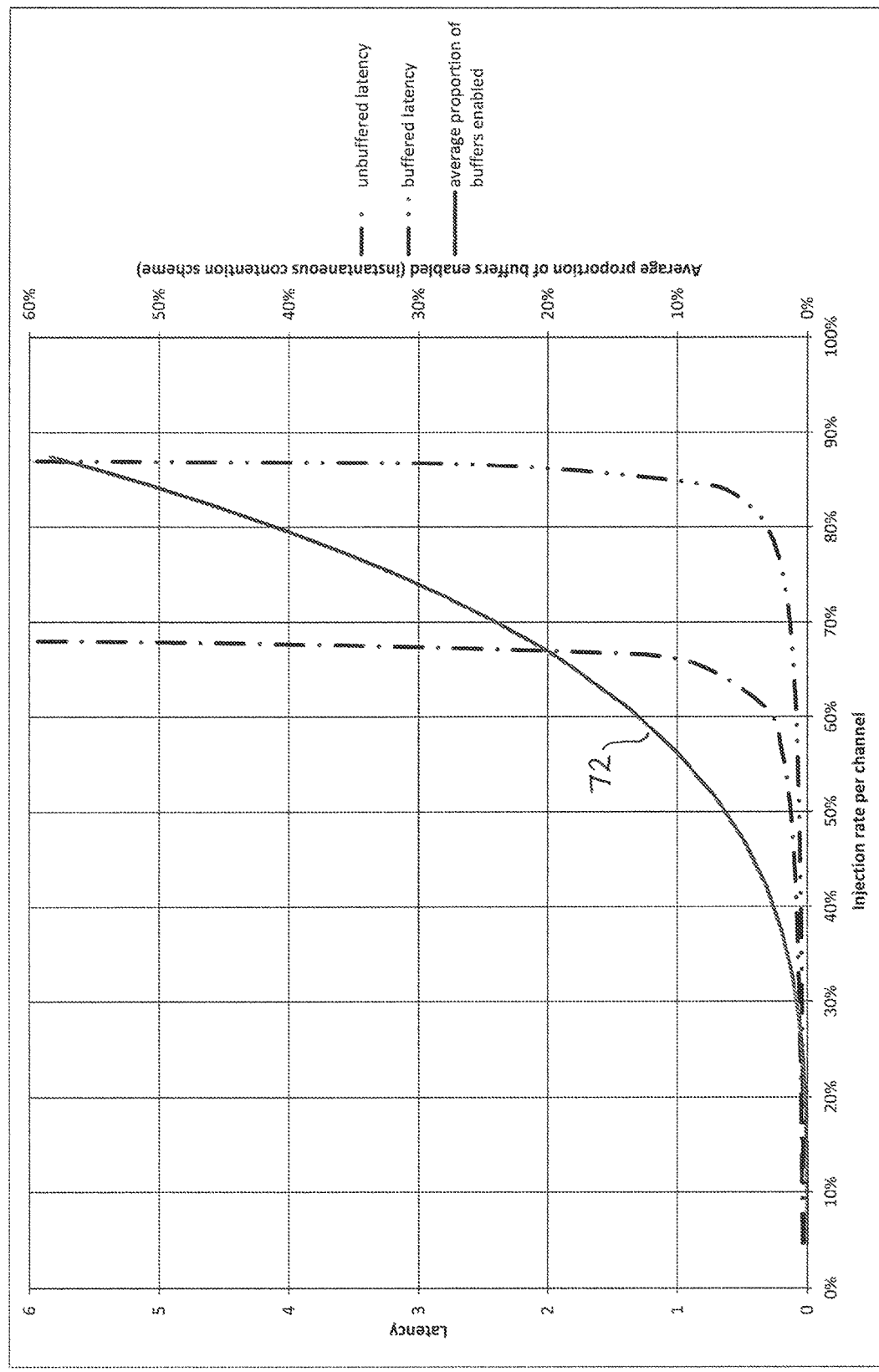
FIG. 4 is a graph, similar to FIG. 2, also showing a plot of contention versus injection rate for the buffered case.

FIG. 4 graphically depicts a simulation of a crossbar switch using the present techniques. As in FIG. 2 above, the latency (primary Y-axis) is plotted against injection rate per channel or throughput (X-axis). In FIG. 4, the average proportion of buffers enabled (secondary Y-axis) is also plotted (curve 72) against the injection rate per channel or throughput (X-axis). This curve 72 thus depicts the average proportion of buffers enabled, or average contention, when the instantaneous-contention scheme is used. Of course, when buffers are not used, contention rises much more steeply, but this is not shown on FIG. 4.

As described above, in conventional systems the buffers are enabled on the detection of any instantaneous contention (e.g. when stalls per buffer output >0%). However, enabling the buffers when the system is operating at a relatively small average contention, at injection rates below, say, 50% in this example, means that the buffers may be turned on unnecessarily, as the small increase in throughput may not justify the additional power consumption.

Using the present techniques, an average contention threshold, or an average injection-rate threshold, is set, so that the buffers are only enabled once the threshold is reached. This average may be taken over a small number of cycles. Hence, as will be appreciated from FIG. 4, in situations where the injection rate is below the threshold for some of the time, the buffers will be enabled for less time in comparison to the prior art.

As an illustrative example, when the average contention threshold is set to correspond to 20%, the buffers in the channel are only enabled once this threshold is reached. Using such functionality, the average proportion of buffers enabled would be approximately 20% when operating at approximately 67% throughput, and correspondingly higher above this figure. This is as for the prior art, operating on the basis of instantaneous contention. However, if, for example, the throughput drops for a time to 50%, this only provides 7% average contention and, therefore, the buffers would not be turned for the present illustrative example as the threshold is not reached, whereas in the prior art they would be turned on for 7% of the time.

From FIG. 4, it will be seen that an advantage for throughput may be derived when the average contention threshold is set to be between approximately 5% and approximately 25%, since, below 5%, use of the buffers will be substantially similar regardless of whether the "instantaneous" or the "average" regime is used. Above 25%, use of the buffers will be similar to using a threshold of 25%. As the injection rate rises towards about 68%, corresponding here to a buffer use of about 23%, the (unbuffered) latency tends towards infinity. The buffers should be enabled at the latest by this stage, and in practice 20% has been shown to give best results for the configuration of FIG. 3. If average injection rate is used as the parameter measured, a useful range would be about 30%-70%, depending on the configuration, and in particular 60%-65%.

Therefore, it will be appreciated that the present techniques provide for a reduction in the amount of time the buffers are enabled in comparison to conventional systems. Such functionality provides for increased power efficiency without negatively impacting the achievable throughput.

A further optimisation may be incorporated, namely to reset the accumulator 70 to just below the threshold value when the output (e.g. destination 0) has no request. This ensures that the buffer is enabled whenever new data arrives after a delay. The maximum value of the accumulator 70 determines the time constant of the averaging function. More complex averages could also be envisaged.

In the present examples, data in a buffer 30 takes priority over new data arriving at the inputs 10, such that, once a buffer 30, 30' is selected by the output arbiter 52 and begins to drain, the monitoring function means that the buffer 30, 30' is disabled for accepting new data, thus reducing unnecessary use of the buffer 30, 30'.

Furthermore, when the buffer 30, 30' is a FIFO buffer, the associated bypass 32, 32' is disabled whilst there is data in the buffer 30, 30'. Once all the data in the buffer 30, 30' has drained, the associated bypass 32, 32' may then be enabled when required, thereby maintaining FIFO order.

Furthermore, once the buffer 30, 30' is empty and is not required to be enabled (e.g. due to the average contention rate of the channel being below the threshold), it may be placed in low-power mode, e.g. by clock gating (no longer feeding the clock signal to the buffer) or perhaps by power gating.

As will be appreciated, the buffers 30, 30' associated with a particular output may additionally be enabled or disabled when required, for example to help isolate other inputs to the crossbar switch from a slowly accepting output (e.g. of a Dynamic Voltage and Frequency Scaling (DVFS) cluster).

As noted above, alternatively to using the time-average contention rate, other parameters indicative of a need for buffering can be monitored. For instance, in some embodiments the request rate of entire transactions is detected; an example could be the rate of read address requests in an interconnect protocol such as Advanced eXtensible Interface (AXI). The buffers 30, 30' may be enabled when the request rate, rather than the stall rate, reaches a certain average value. This gives advance knowledge that the buffers may be required, enabling timely wake-up of the buffers from a low-power mode.

In some embodiments at least one buffer is provided for each input to the output multiplexer. A further alternative is to have buffers associated with the input multiplexers 20, 20' rather than (or in addition to) the output multiplexer 50.

The concept can be applied to all structures in which transient demands for increased occupancy may arise that nevertheless do not exceed an average. For example, a transaction tracking list in an interconnect assembly, e.g. in a coherency controller, can be split into small partitions for common low-use cases, while other, perhaps larger, partitions, that in low-use conditions are not used, can be turned on for the less common cases that require high performance for a sustained period. The latter partitions are in effect the "buffers" for the data. The tracking structure or list can be configured to give a "full" response to new requests until it is known that the occupancy level is required not merely instantaneously but for a sufficiently long time to make a significant difference to performance. Here it can be ensured that in any kind of message sequence (for example read request and read data as above) it is known in advance how great the demand on the resource will be, which can eliminate delay before the increased capacity is enabled.

A further development of the present techniques comprises adapting the arbitration scheme carried out in the output arbiter 52 to the state of the buffers 30, 30'.

It has been shown in benchmarks that, when buffering is disabled, an MRU (Most Recently Used) arbitration scheme yields the most efficient system bandwidth of up to 40% more than an LRU (Least Recently Used) arbitration scheme in the presence of non-uniform traffic (e.g. in bursts); this is a consequence of MRU removing head-of-line blocking sooner on average than LRU. In MRU, here the most recently used input channel is chosen when there is contention.

On the other hand, when buffering is enabled, it has been shown in the benchmarks with the same traffic that an LRU arbitration scheme yields the better system bandwidth of up to 10% more than an MRU arbitration scheme. It is possible that this is because the LRU scheme distributes buffer slots more evenly between the inputs using the same buffer (e.g. Source 0 and Source 1), thus increasing the chances of removing head-of-line blocking across all the inputs.

Therefore, further contemplated configurations employ dynamic arbitration schemes, which are dependent on the state of the buffers instead of using purely a single scheme, such as a MRU or LRU scheme, at each arbitration point.

Figure 5:
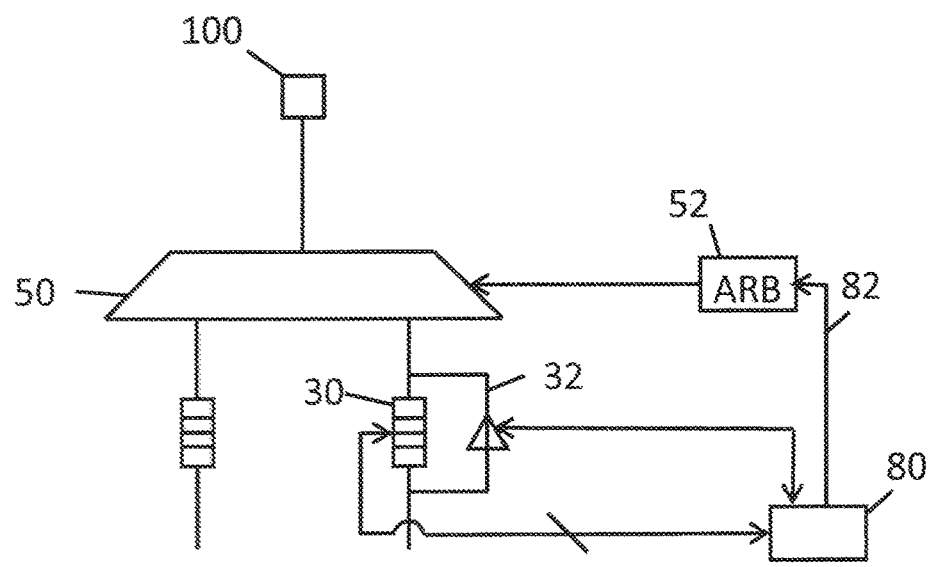
FIG. 5 is a schematic diagram of an embodiment incorporating a controller.

An example is shown schematically in FIG. 5, which shows a detail of a circuit similar to that set out in FIG. 3. Here a further controller 80 is provided, which is configured to control each output arbiter 52 (only one is shown in FIG. 5).

This controller 80 may also be used to control the buffer 30 and bypass 32 as previously described for the controller 60 of FIG. 2, though in other embodiments different controllers 60, 80 may be used.

The arbitration scheme used by the output arbiter 52 can be dynamically set in response to input 82 from the controller 80, so as to arbitrate using an arbitration scheme in dependence on the input 82.

This can be done in a low-cost manner, for example, using only a single bit, by simply inverting the registered record of which input was least recently used when the input is high, to yield the input that was most recently used. This allows the output arbiter 52 to use the MRU arbitration scheme when the buffer 30 is disabled and the LRU arbitration scheme when the buffer 30 is enabled.

In more complex systems other choices of arbitration can be used, such as longest-queue-first.

Furthermore, the arbitration schemes used by the input arbiters (not shown in FIG. 5) or any other arbiters, can also be dynamically set by an associated controller, preferably the same but conceivably a further controller.

Therefore, rather than using a fixed arbitration scheme for each arbiter in the system, the arbitration scheme for a particular arbiter may be dynamically selected based, for example, on the state of the associated buffers so as to provide the best uplift in system bandwidth for each channel depending on the data passing therethrough.

It will be appreciated that whilst MRU and LRU schemes are described above, others, such as a channel-priority scheme, may also be incorporated. With some schemes, measures may be taken to limit the length of time a particular arbitration scheme is maintained, so as to avoid starvation, i.e. where a particular input is never called. MRU, for instance, may need such a measure; therefore, the implemented device can be arranged to switch to LRU from MRU mode if there has been a request that has not been granted for a timeout period.

Furthermore, in FIG. 3 above, two inputs are shown to share a buffer. This may reduce the power overhead since buffers may be considered power-hungry in comparison to other logic. However, it will be appreciated that any number of inputs may be associated with a given buffer.

Figure 6:
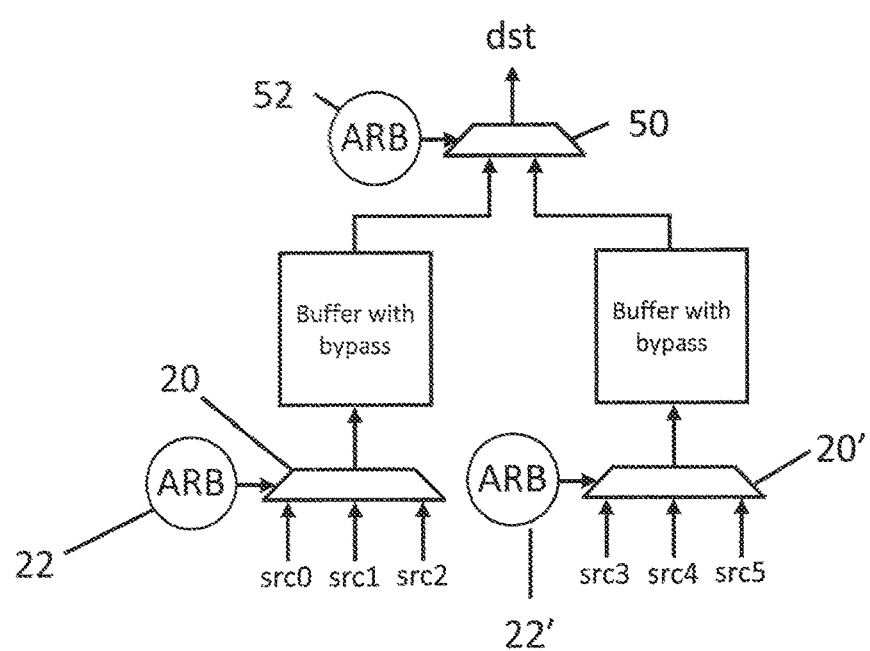
FIG. 6 shows a further version of apparatus envisaged in the present disclosure.

For example, FIG. 6 shows a further embodiment in which two sets of inputs, three in each set (src0-src2 and src3-src5) are each connected to an output (dst) via two input multiplexers 20, 20', respective buffers (e.g. clock-gated FIFOs) having associated bypass circuits and an output multiplexer 50.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the embodiments of the present techniques may suitably be embodied in a logic apparatus comprising logic elements to perform the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer-implemented method of deploying a service comprising deploying computer program code operable to, when deployed into a computer infrastructure or network and executed thereon, cause said computer system or network to perform all of the method.

Alternatively, the embodiment of the present techniques may be realized in the form of a data carrier having functional data thereon, said functional data comprising functional computer data structures to, when loaded into a computer system or network and operated upon thereby, enable said computer system to perform all of the method.

It will be clear to one skilled in the art that many improvements and modifications can be made to the foregoing example embodiments without departing from the scope of the present techniques.

As will be appreciated from the foregoing specification, techniques are described providing a crossbar switch or switching fabric according to claim 1.

In embodiments, the buffer controller may be configured to disable the bypass while the buffer is draining.

Furthermore, the arbiter is configured to have at last two different arbitration schemes selectable by an arbitration controller, this controller selecting a scheme on the basis of whether the bypass is enabled or disabled, wherein the arbitration controller may be the same as or is contained within the buffer controller.

In embodiments the two schemes are MRU and LRU, or MRU and longest-queue-first.

In some embodiments the controller may be configured to obtain the source that was most recently used by inverting a registered record of which source was least recently used.

In embodiments, one or more of the inputs of data is itself the result of an arbitration over two or more inputs.

In some embodiments, the buffer may be a FIFO buffer.

As will be appreciated from the foregoing specification, techniques are also described providing a crossbar switch or switching fabric according to claim 13, and a switching method according to claim 16.

In embodiments, the threshold value may be 20%.

Furthermore, when bypassing is enabled, the arbitration may use one arbitration scheme, and, when bypassing is disabled, the arbitration may use a different arbitration scheme.

In embodiments, the time average may be ascertained by incrementing a counter if there is contention at the output in a given clock cycle, whereby the counter value is set to just below the said predetermined threshold value if there is no request in a given clock cycle.

The invention claimed is:

1. A switching fabric comprising two or more inputs, two or more outputs, a buffer between the inputs and the outputs, an arbiter associated with each output and configured to select data when there is contention at the output, a bypass associated with the buffer so that the buffer can be enabled or disabled, and a buffer controller configured to enable or disable the buffer, the buffer controller further including an accumulator configured to assess whether a time-based average of the contention rate of the output associated with the buffer has reached a predetermined threshold, and wherein the buffer controller is to enable the buffer when the predetermined threshold is reached.

2. The switching fabric according to claim 1, wherein the accumulator monitors the contention rate of the output, incrementing when contention is detected and decrementing with time.

3. The switching fabric according to claim 1, wherein the buffer controller is configured to disable the bypass while the buffer contains data.

4. The switching fabric according to claim 1, wherein the arbiter is configured to have at last two different arbitration schemes selectable by an arbitration controller, this controller selecting an arbitration scheme based on the state of the buffer.

5. The switching fabric according to claim 4, wherein the arbitration controller is the same as or is contained within the buffer controller.

6. The switching fabric according to claim 4, wherein the two schemes are most-recently-used and least-recently-used.

7. The switching fabric according to claim 6, wherein the controller is configured to obtain the source that was most recently used by inverting a registered record of which source was least recently used, or vice versa.

8. The switching fabric according to claim 4, wherein the two schemes are most-recently-used and longest-queue-first.

9. The switching fabric according to claim 1, wherein one or more of the data is itself the result of an arbitration over two or more inputs.

10. The switching fabric according to claim 1, wherein the buffer is a first in, first out (FIFO) buffer.

11. A switching fabric according to claim 1, in which the said predetermined threshold is at least 5%.

12. A switching fabric according to claim 11, in which the said predetermined threshold is less than or equal to 25%.

13. A switching fabric according to claim 1, being implemented as a crossbar switch.

14. A switching fabric comprising two or more data inputs, two or more data outputs, a buffer between the inputs and the outputs, an arbiter associated with each output and configured to select data from one of the inputs when there is contention at the output, a bypass associated with the buffer, and a buffer controller configured to enable or disable the buffer, the buffer controller further including a counter configured to assess whether a time-based average injection rate of the output associated with the buffer has reached a predetermined threshold, and wherein the buffer controller is to enable the buffer when the predetermined threshold is reached.

15. A switching fabric according to claim 14, in which the said predetermined threshold is between 30% and 70%.

16. A switching fabric according to claim 14, being implemented as a crossbar switch.

17. A method of switching in which arbitration is carried out between two or more inputs supplying data to two or more outputs, there being at least one buffer between the inputs and the outputs, and a bypass in parallel with the buffer, the method comprising enabling the buffer when a time average of the contention rate at the output reaches predetermined threshold value.

18. The method according to claim 17, further comprising:
using a first arbitration scheme when the buffer is enabled, and
using a second arbitration scheme when the buffer is disabled.

19. The method according to claim 17, wherein the time average is ascertained by incrementing a counter if there is contention at the output in a given clock cycle.

20. The method according to claim 19, in which the counter value is set to just below the said predetermined threshold value if there is no request in a given clock cycle.

* * * * *